(12) United States Patent
Mazzitelli et al.

(10) Patent No.: US 10,749,968 B2
(45) Date of Patent: Aug. 18, 2020

(54) REAL-TIME RECEIPT OF COMPUTING RESOURCE STATUS MESSAGES FROM CLOUD COMPUTING SYSTEMS

(71) Applicant: Red Hat, Inc., Raleigh, NC (US)

(72) Inventors: John J. Mazzitelli, Sicklerville, NJ (US); Heiko W. Rupp, Stuttgart (DE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/514,546

(22) Filed: Jul. 17, 2019

(65) Prior Publication Data

US 2019/0342399 A1 Nov. 7, 2019

Related U.S. Application Data

(63) Continuation of application No. 15/198,005, filed on Jun. 30, 2016, now Pat. No. 10,523,762.

(51) Int. Cl.
*G06F 15/16* (2006.01)
*H04L 29/08* (2006.01)
*G06F 9/50* (2006.01)
*G06F 9/46* (2006.01)

(52) U.S. Cl.
CPC .............. *H04L 67/141* (2013.01); *G06F 9/46* (2013.01); *G06F 9/5011* (2013.01); *H04L 67/10* (2013.01); *H04L 67/16* (2013.01)

(58) Field of Classification Search
CPC ................................. H04L 67/141; G06F 9/46
USPC ......................................................... 709/228
See application file for complete search history.

(56) References Cited

U.S. PATENT DOCUMENTS

| 8,955,091 | B2 | 2/2015 | Kailash et al. |
| 9,098,344 | B2 | 8/2015 | Chandramouli et al. |
| 9,172,766 | B2 | 10/2015 | Narasimhan et al. |
| 9,237,133 | B2 | 1/2016 | Kruglick |
| 10,257,069 | B1 * | 4/2019 | Ingram ................. G06F 16/188 |
| 2012/0311157 | A1 * | 12/2012 | Erickson ................. G06F 9/541 |
| | | | 709/226 |
| 2013/0091284 | A1 * | 4/2013 | Rothschild .............. G06F 3/067 |
| | | | 709/226 |
| 2015/0058459 | A1 | 2/2015 | Amendjian et al. |
| 2015/0261774 | A1 | 9/2015 | McFerrin et al. |

OTHER PUBLICATIONS

Akhmechet, Slava, "Build real-time Web apps with RethinkDB," InfoWorld, Sep. 1, 2015, 8 pages, http://www.infoworld.com/article/2975838/database/build-real-time-web-apps-with-rethinkdb.html.

(Continued)

*Primary Examiner* — Anthony Mejia
(74) *Attorney, Agent, or Firm* — Withrow & Terranova, PLLC

(57) ABSTRACT

Mechanisms for receiving real-time messages identifying statuses of computing resources from cloud computing systems are disclosed. A computing device receives, from each of a plurality of cloud computing systems configured to implement on-demand computing resources in response to requests, corresponding real-time messages via a plurality of corresponding communication channels, each real-time message identifying a status of at least one computing resource implemented in the respective cloud computing system.

20 Claims, 4 Drawing Sheets

(56) References Cited

OTHER PUBLICATIONS

Author Unknown, "Mobile App Backend Services," Google Developers, last updated Apr. 27, 2016, 15 pages, https://cloud.google.com/solutions/mobile/mobile-app-backend-services#monitoring.

Author Unknown, "Web Socket," Wikipedia, date accessed: Jun. 20, 2016, 5 pages, https://en.wikipedia.org/wiki/WebSocket.

Lin, Wenjie et al., "Scaling Persistent Connections for Cloud Services," [Abstract] Computer Networks: The International Journal of Computer and Telecommunications Networking, vol. 93, Issue P3, Dec. 2015, pp. 518-530.

Macvittie, Lori, "Cloud Computing: Is your cloud sticky? It should be." DevCentral, Nov. 19, 2008, 3 pages, https://devcentral.f5.com/articles/cloud-computing-is-your-cloud-sticky-it-should-be.

Munteanu, Victor Ion et al., "Multicloud resource management: cloud service interfacing," Journal of Cloud Computing: Advances, Systems and Applications, May 12, 2014, Springer, 17 pages.

Non-Final Office Action for U.S. Appl. No. 15/198,005, dated Nov. 15, 2018, 8 pages.

Notice of Allowance for U.S. Appl. No. 15/198,005, dated Mar. 27, 2019, 7 pages.

\* cited by examiner

REAL-TIME RECEIPT OF COMPUTING RESOURCE STATUS MESSAGES FROM CLOUD COMPUTING SYSTEMS

RELATED APPLICATION

This application is a continuation of co-pending U.S. patent application Ser. No. 15/198,005, filed on Jun. 30, 2016, entitled "PERSISTENT REAL-TIME COMMUNICATION CHANNELS WITH CLOUD COMPUTING SYSTEMS," which is hereby incorporated herein by reference in its entirety.

TECHNICAL FIELD

The examples relate generally to cloud computing systems and in particular to the use of persistent real-time communication channels with cloud computing systems.

BACKGROUND

A cloud computing system provides multiple different entities, such as different businesses or different divisions within a business, with on-demand scalable computing resources without a need for the entities to purchase, maintain, and manage their own hardware computing devices. From a user's perspective, a request for a computer resource, such as additional storage or application execution, is made to the cloud computing system, and the cloud computing system implements the request via one or more hardware computing devices owned by the cloud computing system provider. The particular computing device or devices on which the computing resource is implemented by the cloud computing system may not even be known to the user. Cloud computing systems greatly reduce a need for a business to purchase computing equipment and the need for specialized personnel necessary to maintain such computing equipment.

SUMMARY

The examples implement persistent real-time communication channels between a computing device and a plurality of different cloud computing systems. Among other advantages, the examples eliminate a need to iteratively poll and establish connections between the computing device and the cloud computing systems, facilitate the real-time receipt of status and other information from the cloud computing systems, and allow the real-time sending of actions to the cloud computing systems.

In one example a computing device is provided. The computing device includes a memory, a communication interface configured to communicate with a network, and a processor device communicatively coupled to the communication interface and the memory. The processor device is to initiate a plurality of persistent bi-directional communication channels with a corresponding plurality of cloud computing systems. Each cloud computing system comprises a plurality of computing devices used to implement on-demand computing resources on one or more of the plurality of computing devices at the request of different entities. The processor device is further to receive real-time messages from at least some of the cloud computing systems via the corresponding persistent bi-directional communication channel that identifies a status of at least one computing resource implemented in the respective cloud computing system.

In another example a method for implementing persistent real-time communication channels with cloud computing systems is provided. The method includes initiating, by a computing device comprising a processor device, a plurality of persistent bi-directional communication channels with a corresponding plurality of cloud computing systems, each cloud computing system comprising a plurality of computing devices used to implement on-demand computing resources on one or more of the plurality of computing devices at the request of different entities. The method further includes receiving, via the computing device, real-time messages from at least some of the cloud computing systems via the corresponding persistent bi-directional communication channel that identifies a status of at least one computing resource implemented in the respective cloud computing system.

In another example a computer program product for implementing persistent real-time communication channels with cloud computing systems is provided. The computer program product is stored on a non-transitory computer-readable storage medium and includes instructions configured to cause a processor device to initiate a plurality of persistent bi-directional communication channels with a corresponding plurality of cloud computing systems, each cloud computing system comprising a plurality of computing devices used to implement on-demand computing resources on one or more of the plurality of computing devices at the request of different entities. The instructions are further configured to cause the processor device to receive real-time messages from at least some of the cloud computing systems via the corresponding persistent bi-directional communication channel that identifies a status of at least one computing resource implemented in the respective cloud computing system.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
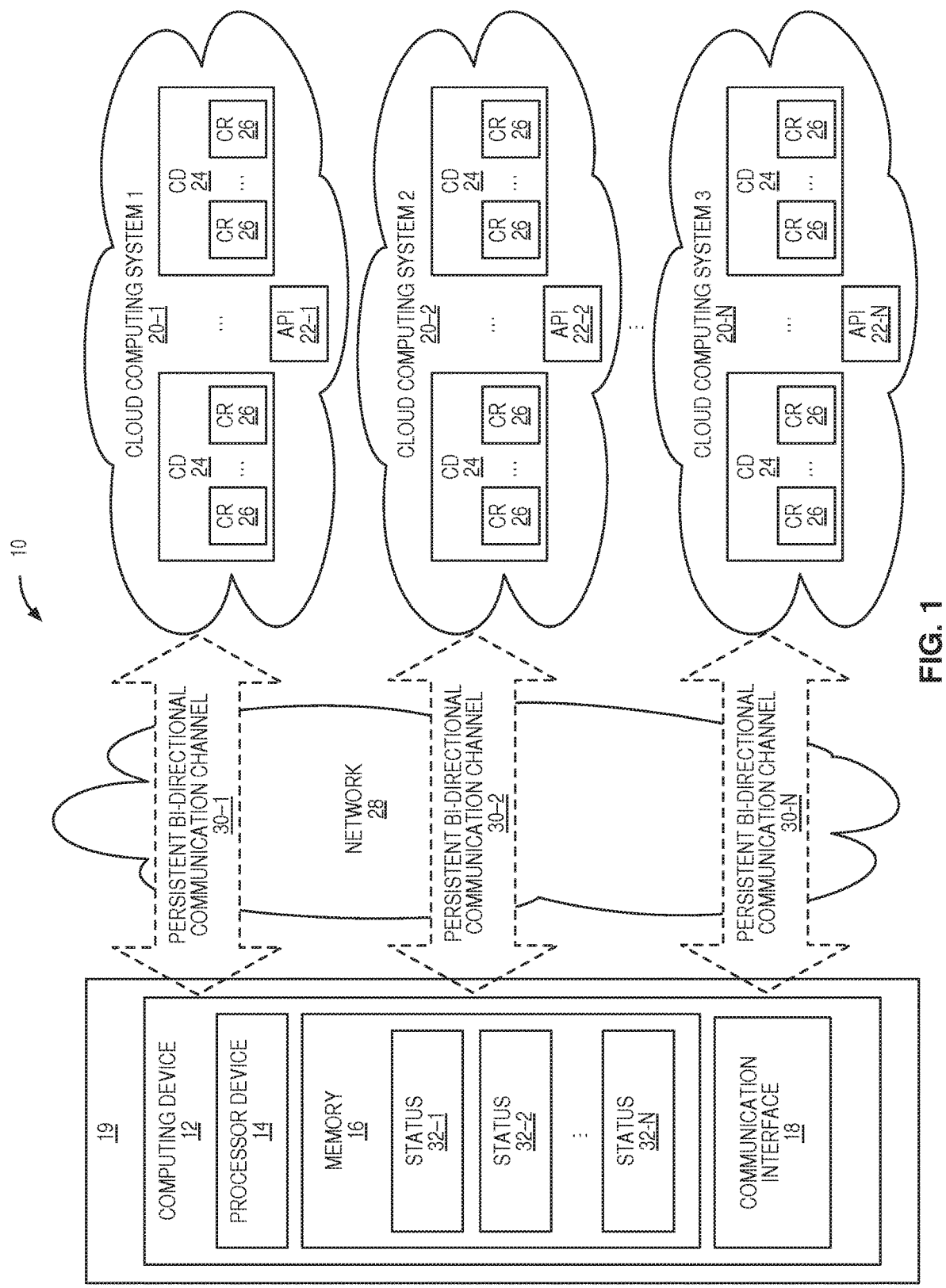
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. As used herein and in the claims, the articles "a" and "an" in reference to an element refers to "one or more" of the element unless otherwise explicitly specified.

The term "persistent bi-directional communication channel" refers to a communication channel between two computing devices, each of which may unilaterally transfer data to the other via the communication channel, and which remains open after transfers of data until one of the computing devices explicitly closes the communication channel. The WebSocket protocol, defined by Internet Engineering Task Force (IETF) Request for Comments 6455, is one example of a persistent bi-directional communication channel. This may be contrasted, for example, with Hypertext Transfer Protocol (HTTP), which is a uni-directional protocol where one computing device establishes a Transmission Control Protocol (TCP) connection and initiates a request, the other computing device provides a response, and the TCP connection is automatically closed.

The phrase "cloud computing system" refers to a system that provides automated on-demand self-service to multiple external entities via an application programming interface (API) over a network to a shared pool of configurable computing devices used to implement requests from the external entities for computing resources, such as data storage, application execution, and database management computing resources.

Iteratively polling a cloud computing system to obtain information from the cloud computing system requires the repeated setting up and tearing down of connections, which increases processor and memory utilization. Moreover, iteratively polling a cloud computing system results in receiving information slower than real-time due to the inter-poll delay associated with polling. In many situations, the real-time receipt of information regarding a computing resource implemented in a cloud computing system may be desirable such that corrective action, if necessary, can be conducted immediately.

The examples implement persistent real-time communication channels between a computing device and a plurality of different cloud computing systems. Among other advantages, the examples eliminate a need to iteratively poll and establish connections between the computing device and the cloud computing systems, facilitate the real-time receipt of status and other information from the cloud computing systems, and allow the real-time communication of actions to the cloud computing systems.

FIG. 1 is a block diagram of an environment 10 in which examples may be practiced. The environment 10 includes a computing device 12 that includes a processor device 14, a memory 16 and a communication interface 18. The computing device 12 may be associated with an entity 19, such as a business, that utilizes a plurality of different cloud computing systems 20-1-20-N (generally, cloud computing system 20). As discussed above, each cloud computing system 20 comprises a system that provides on-demand access to one or more external entities, such as the entity 19 via the computing device 12, via a corresponding API 22-1-22-N to a shared pool of configurable computing devices (CD) 24 used to implement on-demand computing resources (CR) 26, such as data storage, application execution, and database management, at the request of the computing device 12 via a respective API 22. Although not illustrated, each cloud computing system 20 may provide such on-demand computing resources to any number of different entities. Non-limiting examples of cloud computing systems 20 include Amazon® Web Services, Microsoft® Azure, and IBM® Cloud Services.

The computing device 12, in one example, provides a cloud management function for the entity 19. The computing device 12 interacts with the cloud computing systems 20 via one or more networks 28. One mechanism for interacting with the cloud computing systems 20 is via a corresponding API 22 that allows the computing device 12 to unilaterally and on-demand request additional computing resources, such as additional data storage, additional application instances, and/or additional database management capabilities from one or more of the cloud computing systems 20.

In one example, the computing device 12 also initiates a plurality of persistent bi-directional communication channels 30-1-30-N with the plurality of cloud computing systems 20. In one example, the persistent bi-directional communication channels 30 comprise WebSocket communication channels. Over time, the computing device 12 receives real-time messages from at least some of the cloud computing systems 20 that identify a status 32-1-32-N of computing resources 26 implemented by the cloud computing systems 20.

Figure 2:
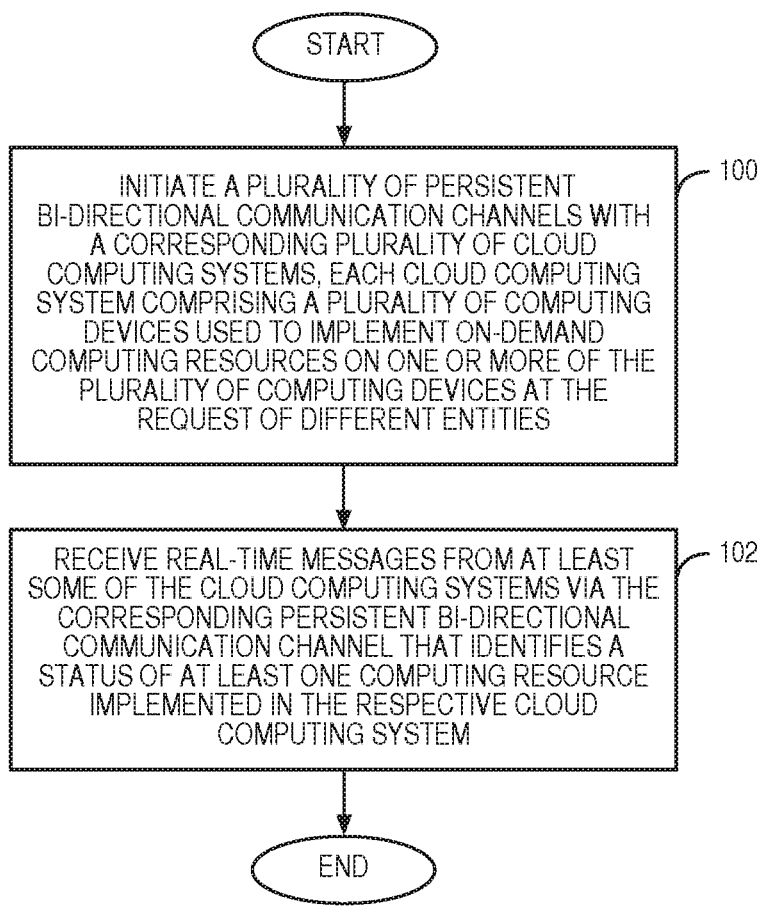
FIG. 2 is a flowchart of a method for implementing persistent real-time communication channels with cloud computing systems, according to one example.

FIG. 2 is a flowchart of a method for implementing persistent bi-directional communication channels 30 with cloud computing systems 20, according to one example. FIG. 2 will be discussed in conjunction with FIG. 1. Initially, the computing device 12 initiates the plurality of persistent bi-directional communication channels 30 with the corresponding plurality of cloud computing systems 20, each cloud computing system 20 being operated by a different cloud provider and comprising a plurality of computing devices 24 used to implement on-demand computing resources 26 on one or more of the plurality of computing devices 24 at the request of different entities via an API 22 (FIG. 2, block 100).

The computing device 12 receives, over a period of time, real-time messages from at least some of the cloud computing systems 20 via the corresponding persistent bi-directional communication channel 30 that identifies a status 32 of a computing resource 26 implemented in the respective cloud computing system 20 (FIG. 2, block 102).

By way of non-limiting example, a status 32 may include a processor utilization of a computing device 24 on which the computing resource 26 is implemented, information identifying a failure and termination of a computing resource 26, information indicating that a computing resource 26 has been deployed and is available for use, information indicating that a computing resource 26 has been terminated and is no longer available for use, or information identifying a usage of a computing resource 26.

In addition, the computing device 12 may send, to one of the cloud computing systems 20 via the corresponding persistent bi-directional communication channel 30, one or more commands relating to the computing resources 26. By way of non-limiting example, the computing device 12 may send a command to deploy an application, a command to terminate an application, a command to provision a new virtual machine, or a command to decommission a virtual machine. In some instances, the command may be sent by the computing device 12 in response to the receipt of a real-time message from a cloud computing system 20 via a corresponding persistent bi-directional communication channel 30. For example, in response to a real-time message from the cloud computing system 20-1 that a computing resource 26 is handling a particular number of connections, the computing device 12 may issue a command to instantiate additional computing resources 26.

The persistent bi-directional communication channels 30, among other features, allow real-time instantaneous communications from the computing device 12 to a cloud computing system 20, and from a cloud computing system 20 to the computing device 12, without a need to establish new connections for each such communication, and without the processing overhead associated therewith.

Figure 3:
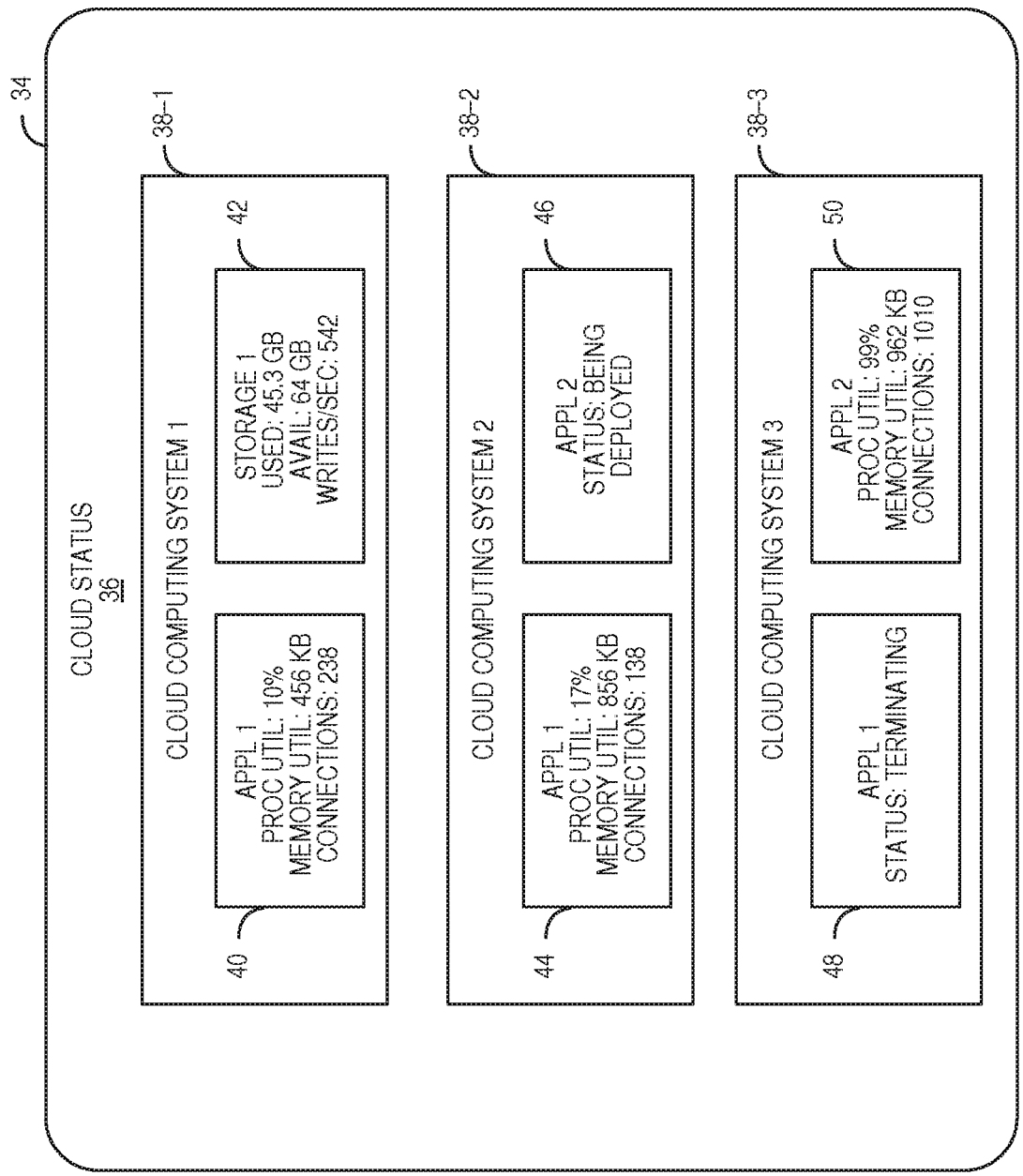
FIG. 3 is a block diagram of a display device on which a user interface is presented that provides information regarding computing resources based on real-time messages received via persistent bi-directional communication channels, according to one example.

FIG. 3 is a block diagram of a display device 34 of the computing device 12 on which a user interface 36 is presented that provides information regarding computing resources 26 based on real-time messages received via the persistent bi-directional communication channels 30 according to one example. A status portion 38-1 includes status information 40 regarding a computing resource 26 that comprises an application instance implemented in the cloud computing system 20-1. The status portion 38-1 also includes status information 42 regarding a computing resource 26 that comprises disk space implemented in the cloud computing system 20-1. A status portion 38-2 includes status information 44 and status information 46 regarding computing resources 26 that comprise two application instances implemented in the cloud computing system 20-2. A status portion 38-3 includes status information 48 and status information 50 regarding computing resources 26 that comprise two application instances implemented in the cloud computing system 20-N.

Figure 4:
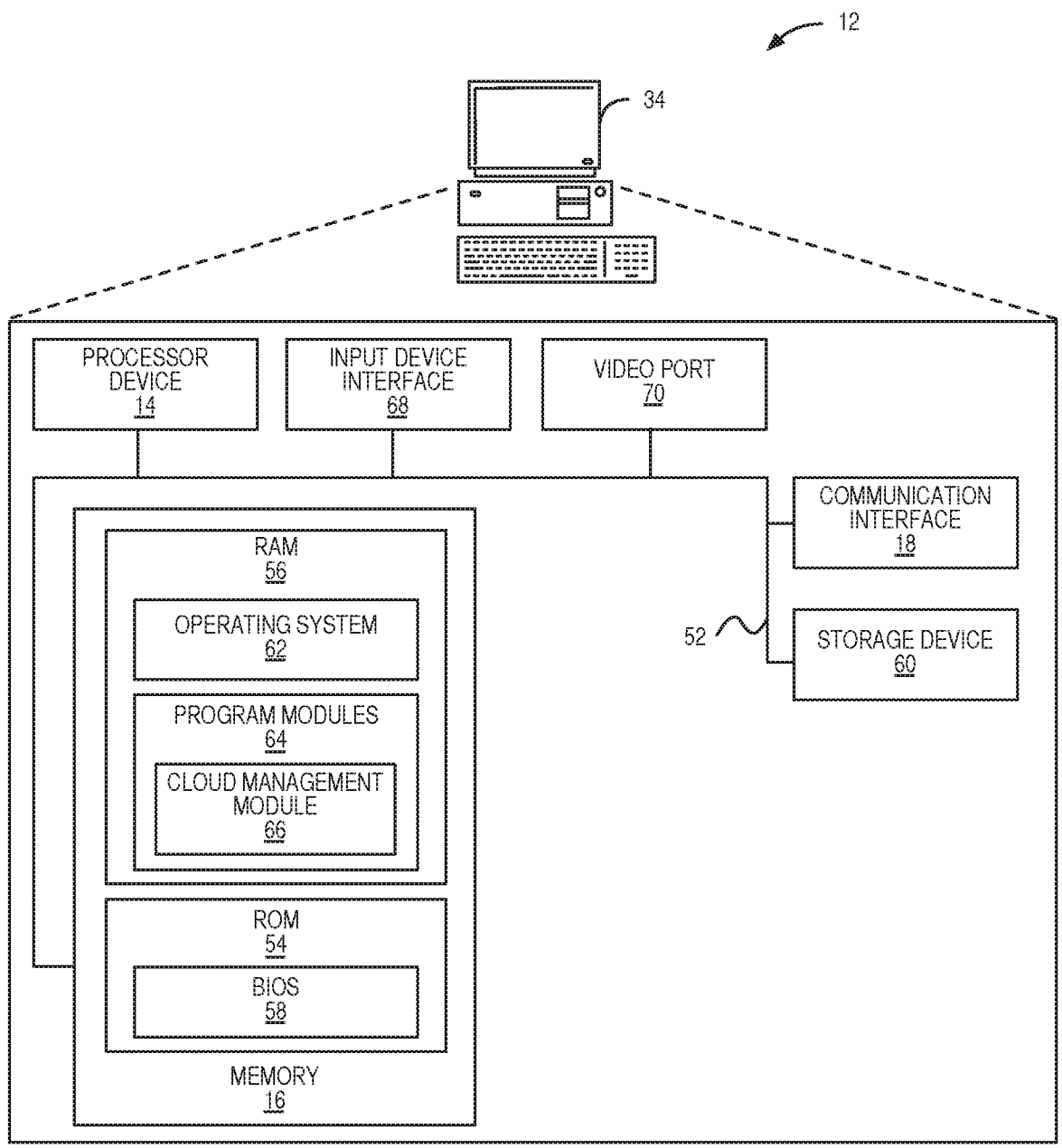
FIG. 4 is a block diagram of a computing device suitable for implementing examples, according to one example.

FIG. 4 is a block diagram of the computing device 12 suitable for implementing examples, according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the memory 16, and a system bus 52. The system bus 52 provides an interface for system components including, but not limited to, the system memory 16 and the processor device 14. The processor device 14 can be any commercially available or proprietary processor device.

The system bus 52 may be any of several types of bus structures that may further interconnect to a memory bus (with or without a memory controller), a peripheral bus, and/or a local bus using any of a variety of commercially available bus architectures. The memory 16 may include non-volatile memory 54 (e.g., read-only memory (ROM), erasable programmable read-only memory (EPROM), electrically erasable programmable read-only memory (EEPROM), etc.), and volatile memory 56 (e.g., random-access memory (RAM)). A basic input/output system (BIOS) 58 may be stored in the non-volatile memory 54 and can include the basic routines that help to transfer information between elements within the computing device 12. The volatile memory 56 may also include a high-speed RAM, such as static RAM, for caching data.

The computing device 12 may further include or be coupled to a non-transitory computer-readable storage medium such as a storage device 60, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 60, and other drives associated with computer-readable media and computer-usable media, may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 60 and in the volatile memory 56, including an operating system 62 and one or more program modules 64, such as a cloud management module 66, which may implement the functionality described herein in whole or in part. It is to be appreciated that the examples can be implemented with various commercially available operating systems 62 or combinations of operating systems 62.

A number of modules can be stored in the storage device 60 and in the volatile memory 56, including, by way of non-limiting example, the cloud management module 66. All or a portion of the examples may be implemented as a computer program product stored on a transitory or non-transitory computer-usable or computer-readable storage medium, such as the storage device 60, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the cloud management module 66 in the volatile memory 56, may serve as a controller, or control system, for the computing device 12 that is to implement the functionality described herein.

An operator may also be able to enter one or more configuration commands through a keyboard (not illustrated) or a pointing device such as a mouse (not illustrated). Such input devices may be connected to the processor device 14 through an input device interface 68 that is coupled to the system bus 52 but can be connected by other interfaces such as a parallel port, an Institute of Electrical and Electronic Engineers (IEEE) 1394 serial port, a Universal Serial Bus (USB) port, an IR interface, and the like.

The computing device 12 may also include the communication interface 18 suitable for communicating with the network 28 as appropriate or desired. The computing device 12 may also include a video port 70 configured to interface with the display device 34, to provide information to an operator.

Individuals will recognize improvements and modifications to the preferred examples of the disclosure. All such improvements and modifications are considered within the scope of the concepts disclosed herein and the claims that follow.

What is claimed is:

1. A computing device comprising:
   a memory;
   a communication interface configured to communicate with a network; and
   a processor device communicatively coupled to the communication interface and the memory, the processor device to:
   receive, from each of a plurality of cloud computing systems configured to implement on-demand computing resources in response to requests, corresponding real-time messages via a plurality of corresponding communication channels, each real-time message identifying a status of at least one computing resource implemented in the respective cloud computing system.

2. The computing device of claim 1 wherein the plurality of corresponding communication channels comprises a plurality of persistent bi-directional communication channels.

3. The computing device of claim 2 wherein the plurality of persistent bi-directional communication channels comprises a plurality of persistent bi-directional WebSocket channels.

4. The computing device of claim 1 wherein the status of the at least one computing resource comprises one of information identifying a processor utilization of a computing device on which the at least one computing resource is implemented, information identifying a failure and termination of the at least one computing resource, information indicating that the at least one computing resource has been deployed and is available for use, and information indicating that the at least one computing resource has been terminated and is no longer available for use.

5. The computing device of claim 1 wherein the processor device is further to send, to one of the cloud computing systems via the corresponding communication channel, a command comprising one of a command to deploy an application, a command to terminate an application, a command to provision a new virtual machine, and a command to decommission a virtual machine.

6. The computing device claim 1 wherein the processor device is further to present, on a display device, information that identifies statuses of the computing resources implemented in the cloud computing systems based on the real-time messages.

7. The computing device of claim 1 wherein the processor device is further to send, to one of the cloud computing systems via the corresponding communication channel, a command to implement a computing resource in the cloud computing system in response to the receipt of a real-time message from the cloud computing system via the corresponding communication channel.

8. The computing device of claim 1 wherein each cloud computing system is operated by a different cloud provider.

9. A method for implementing persistent real-time communication channels with cloud computing systems, comprising:
receiving, by a computing device from each of a plurality of cloud computing systems configured to implement on-demand computing resources in response to requests, corresponding real-time messages via a plurality of corresponding communication channels, each real-time message identifying a status of at least one computing resource implemented in the respective cloud computing system.

10. The method of claim 9 wherein the plurality of corresponding communication channels comprises persistent bi-directional communication channels.

11. The method of claim 9 wherein receiving the real-time messages from at least some of the cloud computing systems via the corresponding communication channel that identify the status of the at least one computing resource implemented in the respective cloud computing system comprises receiving one of information identifying a processor utilization of a computing device on which the at least one computing resource is implemented, information identifying a failure and termination of the at least one computing resource, information indicating that the at least one computing resource has been deployed and is available for use, and information indicating that the at least one computing resource has been terminated and is no longer available for use.

12. The method of claim 9 further comprising sending, to one of the cloud computing systems via the corresponding communication channel, a command comprising one of a command to deploy an application, a command to terminate an application, a command to provision a new virtual machine, and a command to decommission a virtual machine.

13. The method of claim 9 further comprising presenting, on a display device, information that identifies statuses of the computing resources implemented in the cloud computing systems based on the real-time messages.

14. The method of claim 9 further comprising initiating, to one of the cloud computing systems via the corresponding communication channel, a command to implement a computing resource in the cloud computing system in response to the receipt of a real-time message from the cloud computing system via the corresponding communication channel.

15. The method of claim 9 wherein each cloud computing system is operated by a different cloud provider.

16. A computer program product for implementing persistent real-time communication channels with cloud computing systems, the computer program product stored on a non-transitory computer-readable storage medium and including instructions configured to cause a processor device to:
receive, from each of a plurality of cloud computing systems configured to implement on-demand computing resources in response to requests, corresponding real-time messages via a plurality of corresponding communication channels, each real-time message identifying a status of at least one computing resource implemented in the respective cloud computing system.

17. The computer program product of claim 16 wherein the plurality of communication channels comprises persistent bi-directional communication channels.

18. The computer program product of claim 16 wherein to receive the real-time messages from at least some of the cloud computing systems via the corresponding communication channel that identifies the status of the at least one computing resource implemented in the respective cloud computing system, the instructions are further configured to cause the processor device to receive one of information identifying a processor utilization of a computing device on which the at least one computing resource is implemented, information identifying a failure and termination of the at least one computing resource, information indicating that the at least one computing resource has been deployed and is available for use, and information indicating that the at least one computing resource has been terminated and is no longer available for use.

19. The computer program product of claim 16 wherein the instructions are further configured to cause the processor device to initiate, to one of the cloud computing systems via the corresponding communication channel, a command comprising one of a command to deploy an application, a command to terminate an application, a command to provision a new virtual machine, and a command to decommission a virtual machine.

20. The computer program product of claim 16 wherein the instructions are further configured to cause the processor device to present, on a display device, information that identifies statuses of the computing resources implemented in the cloud computing systems based on the real-time messages.

\* \* \* \* \*